United States Patent
Mokashi et al.

(10) Patent No.: US 12,039,278 B2
(45) Date of Patent: *Jul. 16, 2024

(54) SYSTEMS AND METHODS FOR INTERACTION EVALUATION

(71) Applicant: Nice Ltd., Ra'anana (IL)

(72) Inventors: Abhijit Mokashi, Pune (IN); Amram Amir Cohen, Tel Aviv (IL)

(73) Assignee: Nice Ltd., Ra'anana (IL)

( * ) Notice: Subject to any disclaimer, the term of this patent is extended or adjusted under 35 U.S.C. 154(b) by 432 days.

This patent is subject to a terminal disclaimer.

(21) Appl. No.: 17/341,749

(22) Filed: Jun. 8, 2021

(65) Prior Publication Data

US 2021/0294984 A1   Sep. 23, 2021

Related U.S. Application Data

(63) Continuation of application No. 16/370,024, filed on Mar. 29, 2019, now Pat. No. 11,062,091.

(51) Int. Cl.
   *G06F 40/30* (2020.01)
(52) U.S. Cl.
   CPC .................. *G06F 40/30* (2020.01)
(58) Field of Classification Search
   CPC ....... G06F 40/186; G06F 40/284; G06F 40/30
   See application file for complete search history.

(56) References Cited

U.S. PATENT DOCUMENTS

| | | | | |
|---|---|---|---|---|
| 7,133,834 B1 * | 11/2006 | Abelow | | G06Q 30/0245 705/1.1 |
| 8,553,872 B2 | 10/2013 | Geffen et al. | | |
| 11,062,091 B2 * | 7/2021 | Mokashi | | G06Q 30/0201 |
| 2016/0055458 A1 | 2/2016 | Bruce | | |
| 2016/0112565 A1 * | 4/2016 | Surdick | | H04M 3/5175 379/265.06 |
| 2016/0350699 A1 * | 12/2016 | Vymenets | | G06Q 10/063118 |
| 2017/0116552 A1 * | 4/2017 | Deodhar | | G06Q 10/0639 |

(Continued)

OTHER PUBLICATIONS

Echospan, "Executive Ten Competency Review for Ima Sample" Internet Archive Wayback Machine archive available at: https://web.archive.org/web/20131228120605/http://www.echospan.com/~public_docs/sample_ima_standard.pdf, Dec. 28, 2013 (Year: 2013).*

*Primary Examiner* — Michelle M Koeth
(74) *Attorney, Agent, or Firm* — PEARL COHEN ZEDEK LATZER BARATZ LLP

(57) ABSTRACT

A method and system may select an interaction involving an agent, sending the selected interaction and a computerized form to the agent and an evaluator, simultaneously or concurrently, displaying to the evaluator and agent screens defined by the form, each screen including an evaluation question, accepting from the agent, for each evaluation question, an agent answer having associated with the agent answer a rating, accepting from the evaluator a submission indicating that the evaluator has completed the computerized evaluation form, accepting from the agent a submission indicating that the agent has completed the computerized evaluation form, summing an agent rating from the ratings associated with the agent answers provided by the agent, summing an evaluator rating from the ratings associated with evaluator answers provided by the evaluator, and calculating a variance from the agent rating and evaluator rating.

19 Claims, 10 Drawing Sheets

(56) References Cited

U.S. PATENT DOCUMENTS

| | | | | |
|---|---|---|---|---|
| 2017/0300499 A1* | 10/2017 | Lev-Tov | ............. | G06F 16/3329 |
| 2018/0096617 A1* | 4/2018 | Tapuhi | ............... | G06Q 10/0639 |
| 2018/0139324 A1* | 5/2018 | Pearce | ................... | G06Q 30/01 |
| 2019/0362645 A1* | 11/2019 | Miller | .................... | G06N 5/041 |

* cited by examiner

```
{
  "formTitle": "Compliance Call Review",
  "formMaxScore": 100,
  "elements": [
    {
      "id": 1,
      "type": "section",
      "attributes": {
        "question": "Customer Greeting Requirements",
        "numbering": 1
      },
      "elementData": {
        "sectionElementData": [
          {
            "id": 101,
            "type": "yesno",
            "elementData": {
              "attributes": {
                "maxScore": 10,
                "question": "Did the Agent greet the customer after picking up the call?",
                "choiceList": [
                  {
                    "label": "Yes",
                    "value": "1",
                    "score": 10
                  },
                  {
                    "label": "No",
                    "value": "2",
                    "score": 0
                  }]}}]}},
```

Fig. 5A

```
{
    "id": 2,
    "type": "section",
    "attributes": {
      "question": "Compliance Requirements",
      "numbering": 2
    },
    "elementData": {
      "sectionElementData": [
        {
          "id": 201,
          "type": "yesno",
          "elementData": {
            "attributes": {
              "maxScore": 90,
              "question": "All the Procedural Requirements followed?",
              "choiceList": [
                {
                  "label": "Yes",
                  "value": "1",
                  "score": 90
                },
                {
                  "label": "No",
                  "value": "2",
                  "score": 0
                }
              ],
              "numbering": 2.1
        }}
      },
      {
        "id": 202,
        "type": "textarea",
        "elementData": {
          "attributes": {
            "question": "Specify those that were not followed and the reason:",
            "numbering": 2.2
          }}]}}]
}
```

```
{
  "userId": 1213412,
  "score": 10,
  "answer": [
    {
      "answer": "1",
      "score": 10,
      "questionId": 101
    },
    {
      "answer": "2",
      "score": 0,
      "questionId": 201
    },
    {
      "answer": "Didn't follow the compliance procedure number 2 & 4",
      "questionId": 202
    }
  ]
}

{
  "userId": 1213412,
  "score": 100,
  "answer": [
    {
      "answer": "1",
      "score": 10,
      "questionId": 101
    },
    {
      "answer": "1",
      "score": 90,
      "questionId": 201
    },
    {
      "answer": "Followed all the procedures",
      "questionId": 202
    }
  ]
}
```

SYSTEMS AND METHODS FOR INTERACTION EVALUATION

PRIOR APPLICATION DATA

The present application is a continuation of prior U.S. application Ser. No. 16/370,024 entitled "SYSTEMS AND METHODS FOR INTERACTION EVALUATION" and filed on Mar. 29, 2019, incorporated by reference herein in its entirety.

FIELD OF THE INVENTION

The invention relates generally to technology for analysis and evaluation of interactions such as conversations or other documents.

BACKGROUND OF THE INVENTION

Companies and organizations such as call centers may create and store document or interactions, which may be conversations or data exchanged between, typically, an agent or representative (typically human) of the company and a customer. Interactions may include, for example, voice, audio or video recordings of conversations, and/or other data such as text, e-mail or instant messaging exchanges. Interactions may be converted to other formats for analysis: e.g. an interaction may include an audio conversation and/or a text version of that conversation created by for example automatic speech recognition (ASR).

Interactions, documents or other data or events may be evaluated to determine quality or find mistakes or areas for improvement. Such evaluation may involve a third-party such as a manager or supervisor listening to the interaction or reading interaction transcripts and rating the interaction overall, rating specific aspects of the interaction, or answering specific evaluative questions. The agent involved in (e.g. participating in) the interaction may also be asked to evaluate the interaction. However, current technology allowing for evaluation by agents is imperfect, for example because agents are often asked to perform an evaluation after the evaluation by another person, or after seeing evaluation results produced by another person or process. Agents may be less engaged in the process due to this and other defects in existing technology.

There is a need to allow more effective analysis, and automatic analysis.

SUMMARY OF THE INVENTION

A method and system may include selecting, based on searching over a set of documents such as interactions, using a distribution definition, an interaction, the interaction involving an agent, sending the selected interaction and a computerized evaluation form to the agent and an evaluator, substantially simultaneously or concurrently, using an evaluation module, displaying to each of the evaluator and agent a set of screens defined by the evaluation form, each screen including an evaluation question, accepting from the agent, for each evaluation question, an agent answer having associated with the agent answer a rating, accepting from the evaluator a submission indicating that the evaluator has completed the computerized evaluation form, accepting from the agent a submission indicating that the agent has completed the computerized evaluation form, summing an agent rating from the ratings associated with the agent answers provided by the agent, summing an evaluator rating from the ratings associated with evaluator answers provided by the evaluator, and calculating a variance from the agent rating and evaluator rating.

BRIEF DESCRIPTION OF THE DRAWINGS

Dimensions of features shown in the figures are chosen for convenience and clarity of presentation and are not necessarily shown to scale. The invention, both as to organization and method of operation, together with objects, features and advantages thereof, can be understood by reference to the following detailed description when read with the accompanied non-limiting drawings. Embodiments of the invention are illustrated by way of example and not limitation in the figures of the accompanying drawings, in which like reference numerals indicate corresponding, analogous or similar elements, and in which:

FIGS. 5A and 5B depict an example form definition, according to embodiments of the present invention.

FIG. 6 depicts an example user interface for creating a form, according to an embodiment of the present invention.

FIG. 7 depicts a screen seen by a person evaluating an interaction (e.g. an agent or evaluator), according to some embodiments.

FIG. 8 depicts an example of a data storage format for answers to questions, according to some embodiments.

FIG. 9 depicts an example screen displayed after an evaluation is complete, according to one embodiment.

Figure 1:
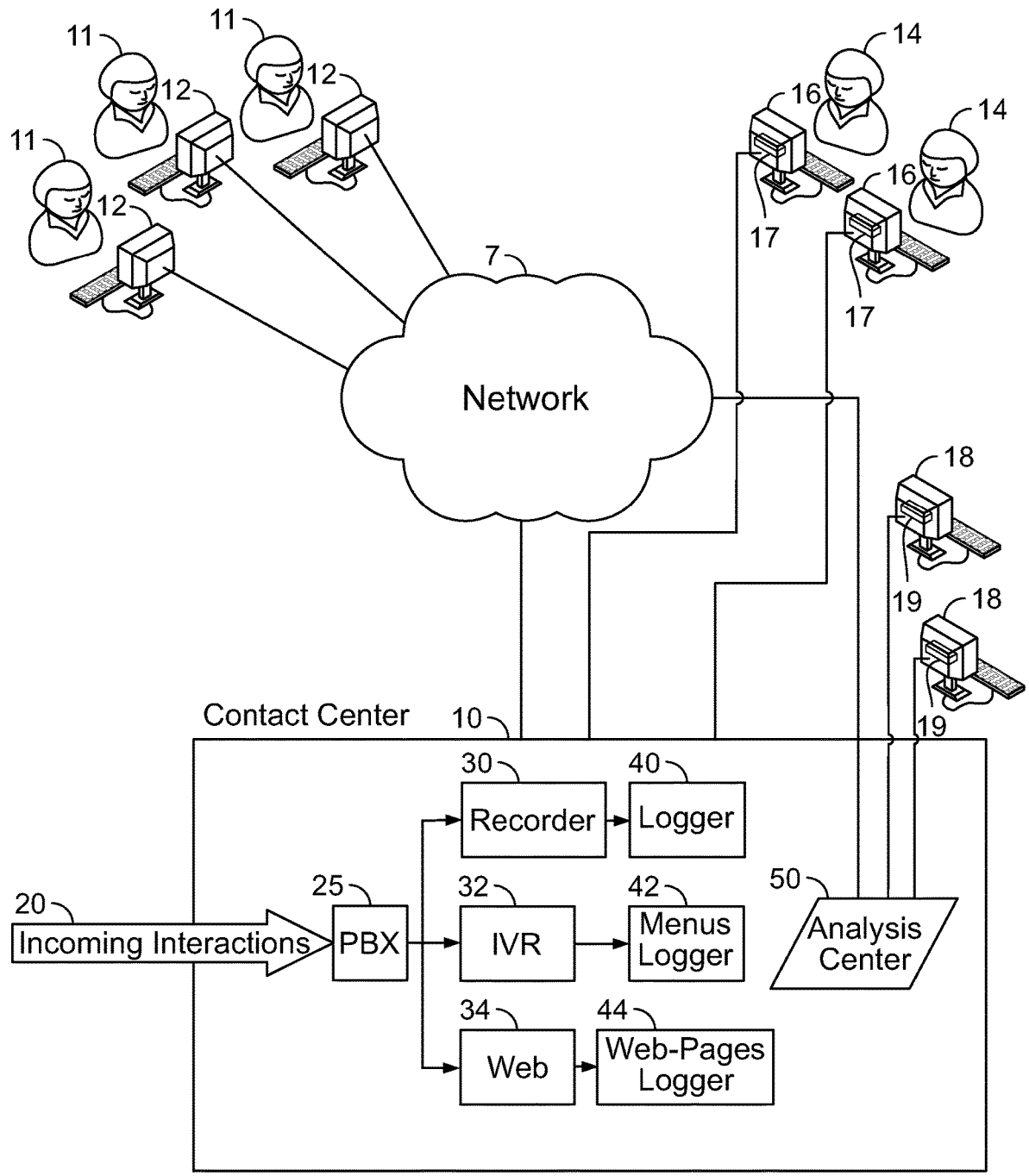
FIG. 1 is a block diagram of a system for analyzing interactions according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may improve existing technology for evaluating, analyzing or rating interactions, calls, or other files or documents. A computer system may allow a user to define occurrence data or a time interval definition which describes how often to distribute forms and documents or how often a process is to select an interaction or other document from among a set of interactions or documents for evaluation. A user may input data to define a set of selection or search parameters or criteria, or a parameter definition, defining parameters used to decide which interactions to select or search for when selecting an interaction. A distribution definition may include parameters such as occurrence data or a time interval definition, selection parameter definition, and/or other parameters. A time interval definition may define for example a fixed period (e.g. once every two hours) or another type of selection frequency, but may define when searching or selecting is to take place according to a different definition. A time interval definition may apply to each agent within an organization, and in such a case for each agent (in the organization, or in a subset of agents) evaluations may occur according to the same time interval, or according to a time interval specific to the agent.

A user may create a computerized evaluation form, which may when executed or processed cause the display of a series of questions (e.g. 10, 50, or any other suitable number), typically across a series of screens, so that an agent or evaluator may rate or analyze an interaction. The user may input a set of evaluation questions (e.g. did the agent properly greet the customer); for each evaluation question, one or more answers (e.g. yes/no, or for other questions a set of choices such as good/bad/average, happy/ambiguous/unhappy; resolved/unresolved) and ratings or scores associated with each answer. The ratings or scores may be predefined, e.g. set by a person designing a form prior to an evaluation. For example, the user defining the form may define a question "Was the customer happier at the end of the call than at the beginning", with associated answers and scores "happier", score 10; "the same"; score 5; and "less happy at end", score 0. A form, which may be for example a computer-generated set of questions and answers, may be created from the questions, answers, scores or ratings, and possibly other information. Each pre-defined answer is associated with a rating or score, and each specific instance of that answer (e.g. an actual agent answering "no" to a certain question) is associated with or inherits the rating or score associated with the pre-defined answer.

A computerized evaluation form (including a set of questions) may be associated with, or may be used with, a distribution definition such that a distribution definition selects certain interactions to be evaluated with the certain evaluation form; for each interaction selected, the agent involved (e.g. participating in the interaction) is chosen to evaluate the form along with another evaluator. For evaluations, different forms may be assigned to or used with different distribution definitions.

A process may, according to the time interval definition, periodically (e.g. once per day per agent, once per minute for a pool of agents, etc.) select from a set of recorded interactions, calls, or other files or documents, an interaction or other document for evaluation or analysis. The selection may be both random and according to selection parameters or criteria. For example, for interactions or documents meeting a set of selection criteria, a selection may be made randomly, picking a random interaction that meets the search definition or parameters. Typically, but not always, the parameters are input to select problematic interactions, such as interactions that take too long (e.g. have lengthy key performance indicators (KPIs) over a certain number of minutes), or interactions that show poor engagement (e.g. have low agent engagement KPI). In other embodiments search or selection parameters may include the type of interaction (e.g. voice, chat, e-mail, etc.), whether the interaction is incoming or outgoing, may be based on text analytics specifications, etc.

Each interaction may be associated with or involve an agent, typically the agent participating in the interaction. An interaction typically involves a participating agent, a customer, and possibly other participants. Based on the time interval definition, an interaction may be selected and sent to the associated or involved agent, and also, substantially simultaneously or substantially at the same time (e.g. within several seconds or a shorter period of time) sent to another evaluator for evaluation, using the evaluation form. Each of the agent and evaluator may evaluate or analyze the interaction using the structure of the form (in other embodiments more than two people may evaluate a document or interaction). The agent and evaluator evaluation may occur concurrently, or within the same time period, but need not occur simultaneously or concurrently. For example, each of the agent and evaluator may perform their own evaluation within the same hour, or same day. In one embodiment, the agent should perform the entire evaluation without knowing the outcome of the other person's evaluation. Thus, at least the agent does not learn of the outcome of the evaluator evaluation until some point in time after the agent completes evaluating; it may also be that the evaluator does not learn the outcome of the agent evaluation until after the evaluator completes evaluating.

Each person may operate an evaluation module, for example executed by a computer, which may display to each of the evaluator and agent a set of screens defined by the evaluation form, each screen including one or more evaluation questions. The evaluation module may accept or receive (e.g., have transmitted to, or have input for example via a user interface) answers to the questions from the agent and from the evaluator, each performing the process independently, and inputting possibly different answers. The accepted answers may have scores or ratings assigned based on the assignment of scores to answers in the form. Each pre-defined answer may have a rating or score, and thus each specific actual answer, or actual instance of that answer (e.g. a specific evaluator answering a certain question using a pre-defined answer) may be associated with or inherit the rating or score associated with the pre-defined answer. Thus, when used, herein, an "answer" may be a definition in a form which may be presented to an agent or evaluator as a possible answer among others, and may also be an actual specific instance of an answer. Thus an answer in a form may have, after evaluations, many recorded instances of the answer by specific people, for specific interactions.

After completing the form (e.g. answering all questions in the form), each of the agent and evaluator may send a submission or indication that the person has completed the computerized evaluation form; this may occur at different times for each of the agent and evaluator. Once the later of the two submits a completion indication, an evaluation or report may be presented to the agent, evaluator, and/or another person. The report may show a variance in overall ratings or specific ratings, and may provide a side-by-side, e.g. on the same screen, comparison of answers provided. In one embodiment each agent rating from the ratings associated with the answers provided by the agent is added or summed to create a total agent score and a total evaluator score, a mean or average of the total agent score, and a total evaluator score is created. The percentage variance may be the sum of the difference between the evaluator score and mean of the different evaluators scores, and the difference between the agent score and that mean, divided by the maximum possible score (where only answers with the highest associated score for each question are provided) times two, and multiply by 100 to obtain a percentage. Other methods of computing a variance may be used. If more than one evaluator is used the highest score is multiplied by the number of evaluators.

FIG. 1 is a block diagram of a system for analyzing interactions according to an embodiment of the present invention. While FIG. 1 shows a such a system in the context of a contact center, embodiments of the invention may be used in other contexts. Incoming interactions 20 (e.g. conversations, telephone calls, IVR interactions, etc.) among people 11 (e.g., customers) and agents 14 may enter or be produced at (e.g. recorded) a contact center 10 and be routed for example by a PBX (private branch exchange) 25 or other equipment to relevant systems, such as interactive voice response (IVR) block or processor 32, Internet sessions or web block 34 and voice interactions block or recorder 30. People 11 may operate user equipment 12 to communicate with agents 14 via contact center 10; and agents 14 may operate agent terminals 16 for that communication, evaluation and other purposes. User terminals 18 may allow users, such as contact or data center personnel, managers, evaluators, etc., to create, configure, execute and view evaluations (e.g. created sets of evaluation questions and). Incoming interactions 20 may be pre-processed and may enter the system as text data, or may be converted to text (e.g. via ASR unit 70, FIG. 2). User terminals 18, agent terminals 16, and possibly other equipment may be used to display data and receive data or human input as discussed herein. While interactions are described as being evaluated herein, other documents may be evaluated.

Interaction data or documents may be stored, e.g., in files and/or databases: for example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10. While different example modules and databases are discussed herein, the functionality of such units may be combined into different units.

One or more networks 7 may connect equipment or entities not physically co-located, for example connecting user equipment 7, agent terminals 16 and user terminals 18 to contact center 10. Networks 7 may include for example telephone networks, the Internet, or other networks.

Web block 34 may support web interactions over the Internet (e.g. operate web pages which may be executed in part on user equipment), IVR block 32 may provide menus and other information to customers and for obtaining selections and other information from customers, and recorder 30 may process or record voice sessions with customers. It may be appreciated that contact center 10 presented in FIG. 1 is not limiting and may include any blocks and infrastructure needed to handle voice, text (SMS (e.g. short message service), WhatsApp messages, chats, etc.) video and any type of interaction with costumers.

Figure 3:
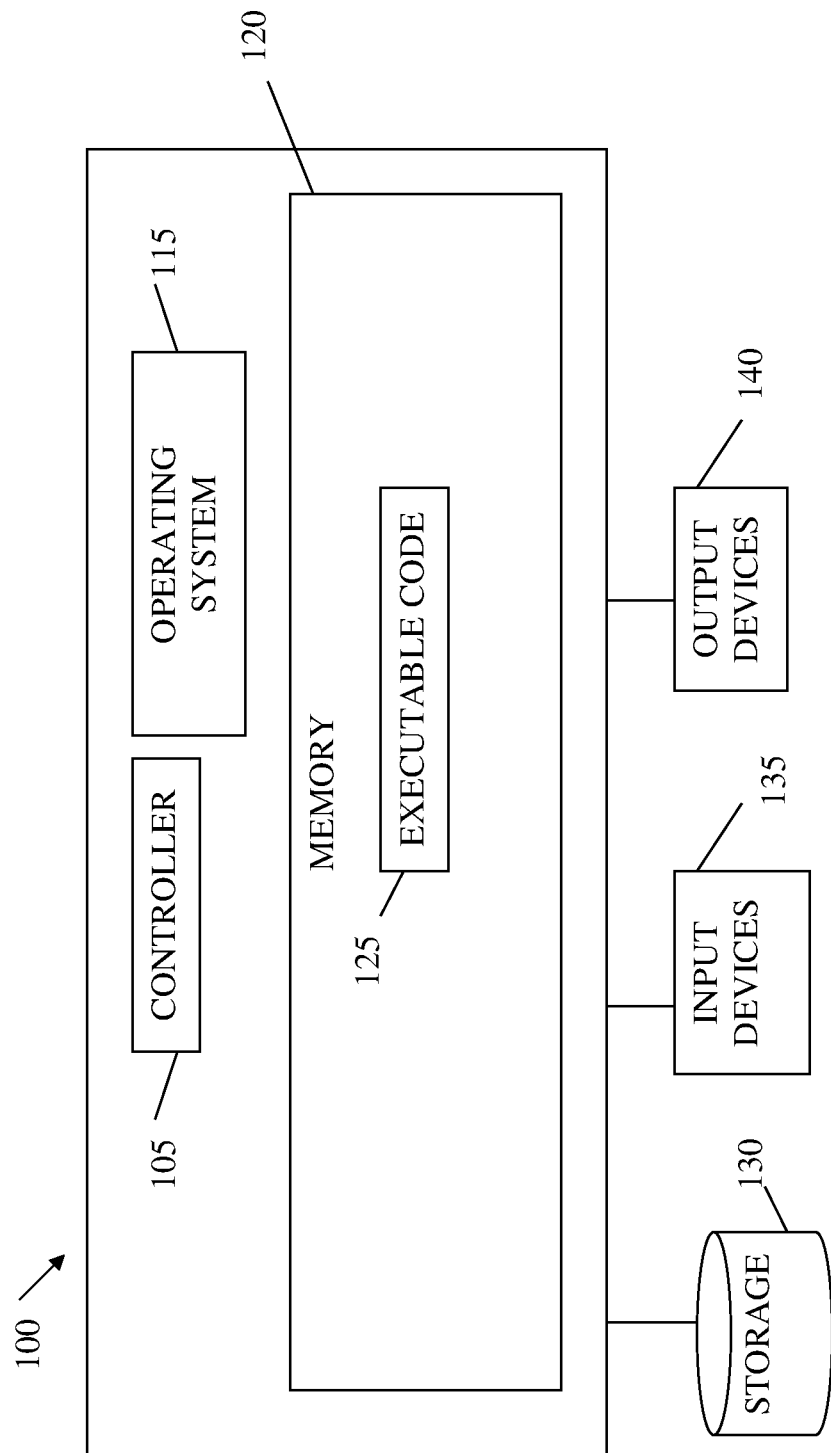
FIG. 3 is a block diagram of a computer system used with or executing embodiments of the present invention.

User equipment 12, agent terminals 16 and user terminals 18 may include computing or telecommunications devices such as personal computers or other desktop computers, telephones, cellular telephones, portable or tablet computers, smart or dumb terminals, etc., and may include some or all of the components shown in FIG. 3 such as a one or more processor(s), or other computing components.

Figure 2:
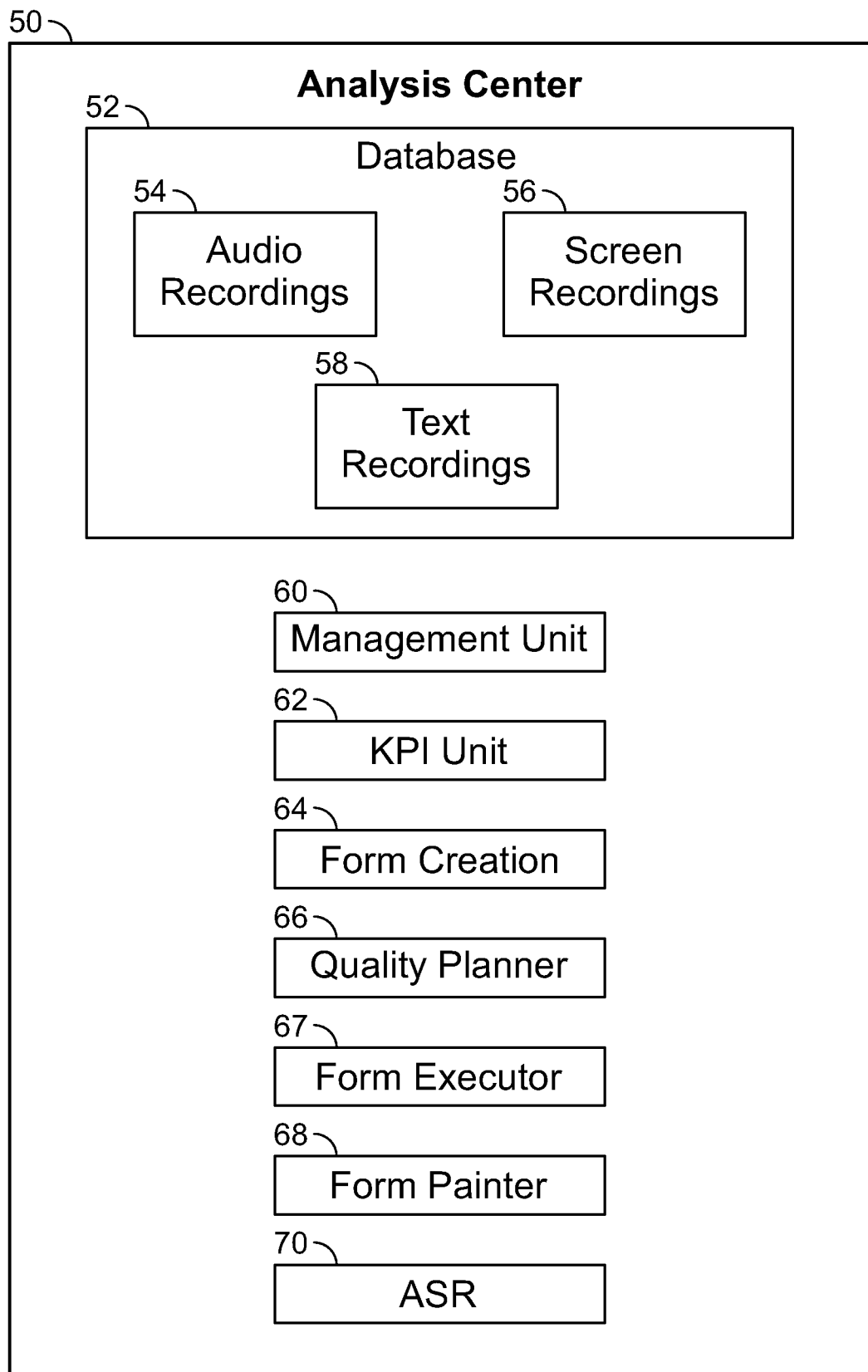
FIG. 2 is a high-level block diagram of an analysis center according to embodiments of the present invention.
Figure 4:
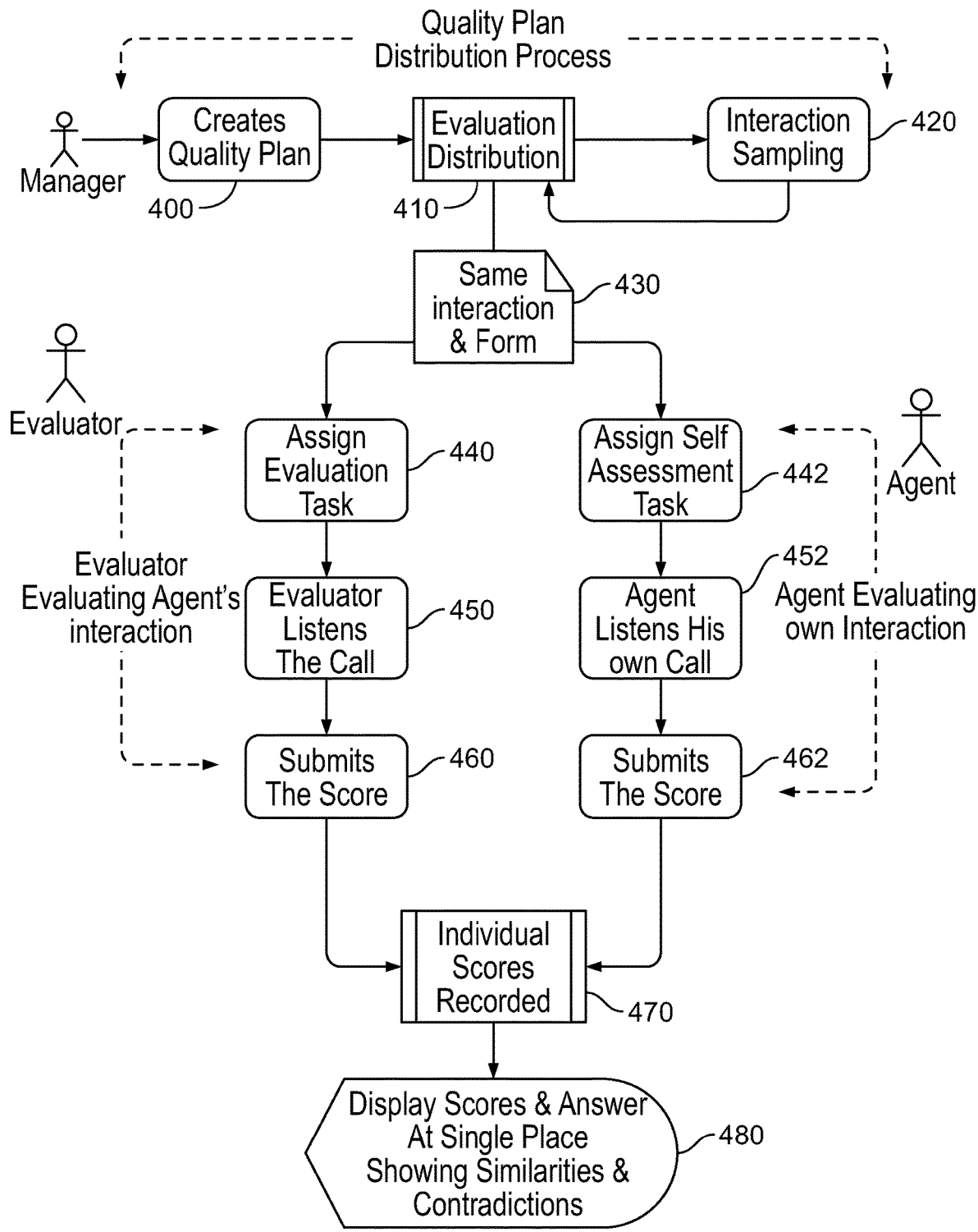
FIG. 4 is a flowchart of a method according to embodiments of the present invention.

FIG. 2 depicts an example analysis center 50 which may perform functions such as those shown in FIG. 4. Analysis center 50 may include components other than as shown. Analysis center 50 may include for example a database 52 (e.g. stored in memory 120 or storage 130, FIG. 3) including for example audio recordings 54 (e.g. interactions or conversations), screen recordings 56 (e.g. of screenshots or other data associated with interactions), and text communication recordings 58. Additional data may be stored in database 52, for example transcripts, metadata associated with a recording of an interaction or call which may indicate when the call was held, the agent who handled the call, an outcome of the call, ratings produced typically after the call, etc. In some embodiments, database 52 may include or be included as part of other databases shown for example logger 40, menus logger 42, and web-page logger 44. Other data repositories or data may be used.

Analysis center 50 may communicate with one or more user terminals 18 and agent terminals 16 (e.g. via a browser or other locally executed software or module) to for example provide visualizations, generate forms, accept answers, etc. Analysis center 50 may execute and manage a quality review process.

Analysis center 50 may include modules to carry out methods as discussed herein. Analysis center 50 may include a management unit 60 which may control the overall process, execution and management of a quality review process. An automated analysis or KPI unit 62 may enable a definition of new KPIs and/or implementing KPI related procedures, e.g., creating or calculating KPIs or other measures of documents or interactions, determining if a KPI was breached or violated or a threshold was exceeded. Automated analysis or KPI unit 62 may automatically evaluate certain aspects of interactions. For example, KPI unit 62 may rate for each interaction an interaction length KPI (rating how long the interaction is); a customer retention KPI (e.g. is the customer still a customer); an agent engagement KPI (e.g. is the agent following rules or a script, using the correct application, or other measures), a number of transfers KPI, a First Call Resolution (FCR) KPI, etc.

Form creation tool 64 may create the evaluation forms (e.g. data structures which when executed or input to a module allow documents or interactions to be evaluated). Quality planner module 66 may be used to create a quality plan, which may include a form and a plan or scheme for using the quality plan for providing evaluations. Form executor module 67 may control the evaluation by automatically transmitting or distributing forms and interactions or documents for evaluation, executing the evaluation and storing the data in conjunction with form painter module 68 and local units such as browsers installed on local user devices. According to data in a quality plan, criteria for the interactions to be selected may direct quality planner module 66 to select and distribute documents for evaluation, and cause form executor module 67 and form painter module 68 in conjunction with internet browsers (or other locally executed software or module) 17 and 19 to display questions, and accept answers which may be stored by form executor module 67. Quality planner module 66 may select the interaction as per the defined criteria and distribute the form and interaction to form executor module 67, which may in turn distribute the form and interaction the evaluators and agents for evaluation. Quality planner module 66 may operate according to a time interval definition defining how often (e.g. a period of time, an interval between selections, the number of selections to make per time period, etc.) to select interactions. Form painter module 68 may paint or display results as a report or presentation showing for example similarities and differences between answers given by an evaluator and an agent and a variance or other measure of difference.

Form creation tool 64, quality planner module 66, executor module 67 and form painter module 68 may be integrated for example within the CXone Quality Management Application from Nice Ltd. A form created by form creation tool 64, data used by and recorded by form executor module 67, and data displayed by form painter module 68 may be stored for example in the JSON format (JavaScript Object Notation, an open-standard file format that uses human-readable text to transmit data objects, for example attribute—value pairs and array data types (or other serializable values)), in a MySQL database, e.g. in storage database 52 (FIG. 2) but other formats and other database systems may be used. An evaluation process may use agent terminals 16 and user terminals 18 to display questions and receive or accept input, and reports or visualizations may be provided via agent terminals 16 and user terminals 18. For example, form creation tool 64, quality planner module 66, executor module 67 and form painter module 68 may perform processing "locally" at analysis center 50, and present a user interface to users via Internet browsers 17 and 19 using, for example, a Web service application programming interface (API) that uses Representational State Transfer (REST) architectural constraints, e.g. a RESTful API. Other tools and modules may be used, and processing may take place at locations other than described.

ASR unit 70 may input audio files, such as recordings of conversations, and output (e.g. for storage in database 52) a text version of the recordings or files, such as a transcript. In one embodiment creating forms and performing evaluations using forms may be performed by Internet browsers 17 and 19 executing code such as written in the AngularJS language using input data (e.g. questions, scores, answers) stored in the JS ON format. Other modules, languages and data formats may be used. Modules such as quality planner module 66, executor module 67 and form painter module 68 may interface with Internet browsers 17 and 19 to cause display and input of information as disclosed herein.

FIG. 3 shows a high-level block diagram of an exemplary computing device which may be used with embodiments of the present invention. Computing device 100 may include one or more controller(s) or processor(s) 105 that may be, for example, a central processing unit processor (CPU), a chip or any suitable computing or computational device, an operating system 115, a memory 120, a storage 130, input devices 135 and output devices 140. Each of modules and equipment such as contact center 10, PBX 25, IVR block 32, voice interactions block or recorder 30, menus logger 42, Internet sessions or web block 34, analysis center 50, form creation tool 64, quality planner module 66, executor module 67, form painter module 68 and ASR unit 70 may be or include a computing device such as shown in FIG. 3, although various units among these entities may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may be one or more applications perform methods as disclosed herein, for example the operations of FIG. 4, according to embodiments of the present invention. Modules discussed elsewhere, such as a form creation tool 64, quality planner module 66, executor module 67, form painter module 68, ASR unit 70 and other modules and functions, may be or be executed by one or more processors such as controller 105, and may be code 125 executed by controller 105. In some embodiments, more than one computing device 100 or components of device 100 may be used for multiple functions described herein, e.g. one or more processors in the same device or multiple different devices may carry out methods as described. Thus when used herein "a processor" may mean one or more processors, each possibly performing different aspects of an embodiment. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as forms, documents or interactions may be stored in a storage 130 and may be loaded from storage 130 into a memory 120 where it may be processed by controller 105. In some embodiments, other components may be used and some of the components shown in FIG. 3 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 4 is a flowchart of a method according to embodiments of the present invention. While in one embodiment the operations of FIG. 4 are carried out using systems as shown in FIGS. 1-3, in other embodiments other systems and equipment can be used. The operations of FIG. 4 are examples only, and different operations may occur in different embodiments.

In operation 400, a quality plan may be created. For example, a computer module such as form creation tool 64 may receive accept or receive input from a person (e.g. using a browser or other local software on a computer or terminal) such as a form designer or manager to create a form which may later be integrated in a quality plan. A form may include questions and answers with associated scores, and parameters governing the display of those questions across a series of screens. A quality plan created using quality planner module 66 may include a form and a distribution definition or parameters (e.g. when to distribute documents) defining which documents to access and when the form and documents should be distributed to evaluators. While specific data formats such as a quality plan and a form are described herein, other organizations of data may be used with embodiments of the present invention.

A distribution definition may include information describing, for example, who, how, and when to distribute forms and documents or interactions, and which interactions to distribute. For example, a quality plan may include occurrence data or a time interval definition which describes how often to distribute forms and documents. Occurrence data or a time interval definition may for example direct that a document/form combination is distributed once every period, e.g. monthly, weekly, daily, etc.; may direct that the distribution occurs for a period of time (e.g. a month) and then expires, the distribution occurring with a certain periodicity within the period (e.g. every two hours). A distribution definition may define which agents out of a set of agents to distribute to: e.g. all agents, or only certain agents, and may define the number of interactions to send each agent at once (e.g. an agent may receive one or more tasks, e.g. one, five, etc. each including an interaction to evaluate).

A distribution definition may include document search terms or filters, such as only interactions longer or shorter than a certain time (e.g. those lasting less than a minute; those lasting more than 2 minutes (in case it is desired to evaluate long calls)); those in certain categories; and those of a certain type (e.g. voice call, text interaction); direction (e.g. outbound call, inbound call, internal call). Search terms or filters may include KPIs or other quality or evaluative measures, such as sentiment (e.g. the overall emotional tone of the call, such as positive, neutral, hostile, negative). Search terms or filters may include multiple parameters, e.g. a direction to select calls of type voice, incoming and duration more than 3 minutes, to evaluate long voice incoming calls.

A distribution definition may define which non-agent evaluators to distribute a call to.

The person may input to form creation tool 64 a set of desired questions, each paired or associated with a set of possible answers, each answer including a score or rating typically entered by the person creating the form. Scores or ratings may be predefined by being set by the form designer. Some questions or answers may not have associated scores or ratings, and these questions may not provide input to a final variance. In one embodiment, a pre-set list of questions and/or answers may be provided, and selected (e.g. "dragged and dropped" by the person creating the form. A form may be created, including a series of questions, each with associated answers, each answer with associated scores. Answers are typically selected by a user and thus multiple choice, e.g. "yes", "no", "positive", "neutral", but some questions may be associated with free-form text-entry answers where a user may type comments, list problems or actions taken, etc. Such free-form answers may not be associated with scores, although in some embodiments a score may be associated with such answers. For example, if no text is entered the score is X (e.g. 0), and if any text whatsoever is entered, the score is Y, for example a positive number. A user may select a format for scored answers, e.g. yes/no, a radio button, a dropdown list, etc.

Figure 6:
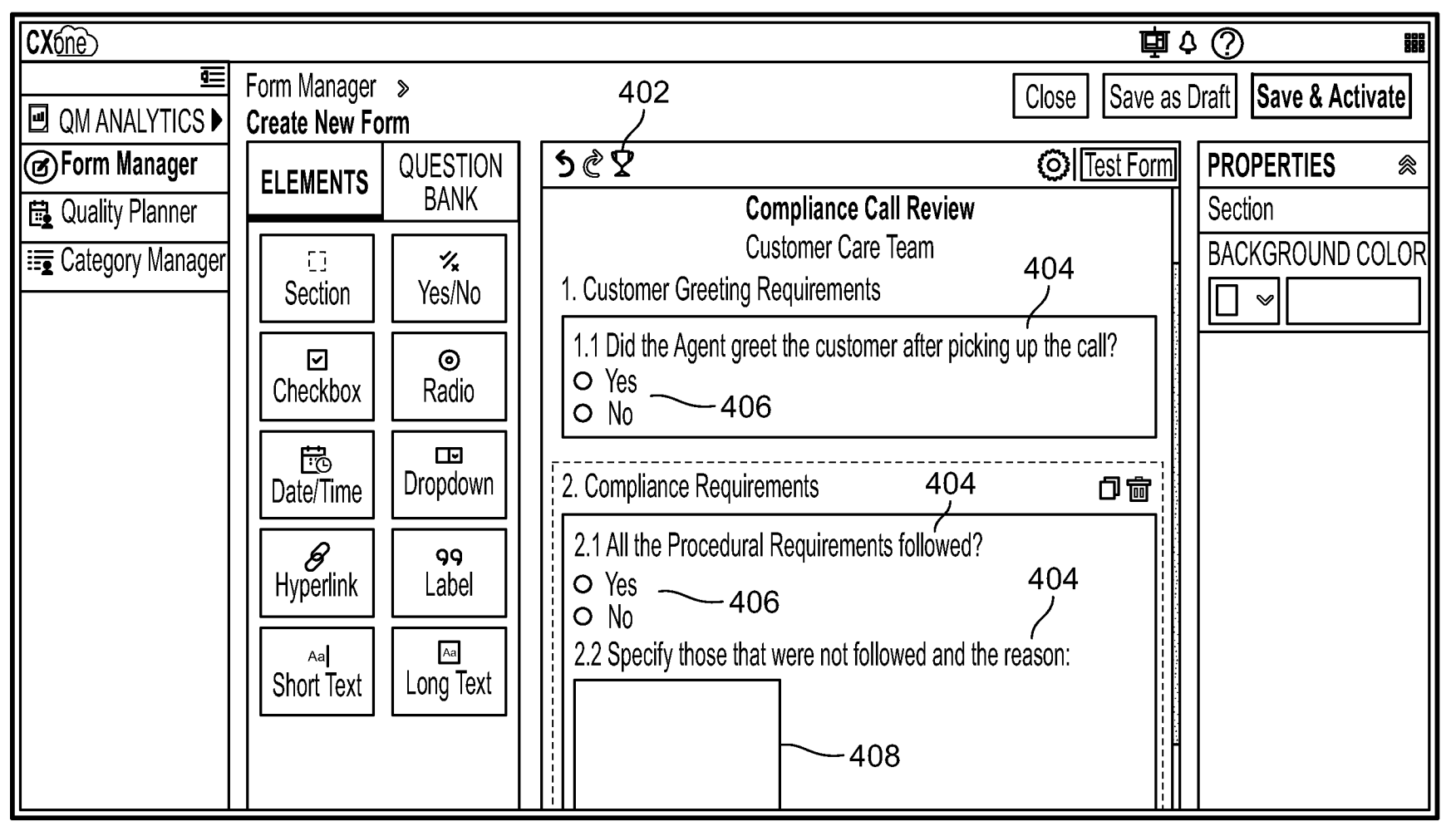

An example user interface for creating a form, according to an embodiment of the present invention, is shown in FIG. 6. A scoring button 402 may if clicked or pressed (e.g. using a mouse or other pointing device) allow a user to enter a score for a question such as questions 404. A user may enter or select prepared answers 406, and assign scores to different answers. A free text box 408 may allow entry of unstructured text as an answer. Rules and actions may be added to a form. For example a ranking rule may cause the execution of the form to display, after an agent and all evaluator(s) have completed the evaluation, a ranking or grade of the agent based on the score, e.g. pass, fail, good, acceptable, needs improvement.

A form may be saved in a system as a data structure, such as in the JSON format. A user may name or otherwise identify a form so the form may be accessed or retrieved. Other data formats may be used. When used herein, "form" may refer to the list of question/answer combinations along with other data such as scores, rules, page or question title categories, etc.; this list as displayed to users (e.g. as a series of screens displayed using a local browser or other module); and also the data structure representing these lists or displays. A form as displayed may include a series of displayable pages, each having one or more questions and answers. In one embodiment a form is displayed and executed by form executor module 67 and form painter module 68 in conjunction with browsers 17 and 19. Questions may be conditional or branch, in the sense that a certain answer to a question may cause or inhibit the asking of one or more further questions, or may be used to decide which further questions to display or ask.

Quality planner module 66 may allow a user to create a quality plan including or referencing both a form and distribution (e.g. when to distribute documents) and search parameters defining which documents to access and when the form and documents should be distributed to evaluators. One form may be thus used with different search and time distribution parameters, and vice versa. Distribution and search criteria may include parameters such as a time interval definition, which may define how often an evaluation process is to select an interaction to send. Parameters may be in the form of for example time interval definition (e.g. defining how often to select an interaction) and selection parameter definition or search parameters, defining parameters for which interactions to select when selecting an interaction; these two definitions may be combined into a distribution definition.

A time interval definition may define how often quality planner module 66 sends evaluations for all agents (e.g. for each agent send an evaluation request once a day); for a specific agent (e.g. for agent "John" send an evaluation request every two hours); or generally (e.g. send an evaluation every minute, regardless of agent). Distribution and search criteria may include a selection or search parameter definition, which may define or include parameters for which interactions to select when selecting an interaction. For example, selection parameters may include interactions with a KPI below a certain threshold, interactions that resulted in another call from a customer, etc. Distribution and search criteria may include a time interval definition, selection parameter definition, and possibly other information or metadata. In other embodiments, the arrangement and structure of form data (e.g. questions, ratings, answers, etc.) and distribution and time parameters may differ.

One example form definition, using the JSON format is shown in FIGS. 5A and 5B. Other form storage formats may be used. In FIGS. 5A and 5B the form titled Compliance Call Review has a maximum score (e.g. the highest total score possible after all questions are answered) of 100, because for the two questions shown the maximum score is 10 and 90, respectively. The example Compliance Call Review includes questions such as "All the Procedural Requirements Followed" with answers Yes having a score 90 and answer no having a score 0. A free text answer may be for example "Specify those that were not followed and the reason", with an area for a user to enter text, and not having an associated score.

In operation 410, evaluation distribution may take place according to the quality plan or time and selection or search parameters, e.g. a distribution definition. Multiple evaluations, each based on the same or a different form, may take place concurrently. A module such as quality planner module 66 may access a form (e.g. from storage database 52, FIG. 2), and in operation 420, periodically and/or according to and at the times or intervals specified the relevant quality plan's time interval definition, search over an overall database of interactions or documents (e.g. stored in storage database 52) using the selection parameter definition associated with the quality plan. The form and interaction may be sent to form executor module 67, which may execute the evaluation. Documents or interactions may include for example audio recording (e.g. of telephone or other calls), text communications (SMS (short message service), WhatsApp messages, chats, etc.), video or other documents or files. In one embodiment the search returns an interaction, and the agent participating in the interaction is sent the form and interaction; in another embodiment the search includes as a parameter the agent generating or associated with the document or interaction. Typically, interactions or documents selected may be randomly selected among documents meeting selection parameter definitions, but in other embodiments random selection need not be used. A random selection may be for each agent who is to receive an evaluation: e.g. one or more interactions may be selected randomly from the search results for a certain agent, to be sent to that agent.

In operation 430, the form along with the selected document or interaction may be distributed or assigned (e.g., to form executor module 67), substantially simultaneously, or concurrently, to the agent involved in the interaction or document (e.g. the agent who participated in the interaction) and one or more third-party evaluator(s), an evaluator being a person different from the agent. Sending a form and document or interaction to be evaluated may take place by quality planner module 66 sending or transferring the form and document or interaction to a form executor module 67 operating in conjunction with form painter module 68 an internet browser or other local software or modules on the relevant user and agent's terminals or workstations. The evaluation task for the form and document may appear on a user's screen (e.g. on a browser 17 or 19) possibly accompanied by a notice or alert. The third-party evaluator may be constant for a form and/or agent, or may be randomly selected among a set of evaluators in order to provide a mix of evaluations for agents. Typically, the same form is sent to both the agent and the evaluator, and an instantiation of that form is created for example on an agent terminal 16 and a user terminal 18, e.g. using form painter module 68. Quality planner module 66, form executor module 67, form painter module 68 and other modules may for example be executed by a central computing system (e.g. analysis center 50) and may operate with local display software (e.g. a web browser executed by on user terminals 18 and agent terminals 16) to display questions and receive input. Alternately, functionality such as of analysis center 50 may be executed locally on user terminals 18 and agent terminals 16. In other embodiments, more than two people may receive and evaluate a form and document or interaction.

In operations 440 and 442, the evaluator and agent may view one or more tasks or evaluation assignments (e.g. via form painter module 68 using internet browsers 17 and 19), which may include a specifically instantiated form paired with a specific interaction or document to evaluate. The evaluator and agent may select a task. The same task—an evaluation of a specific interaction or document—need not be performed by each of the evaluator(s) and agent at exactly the same time, but each should evaluate the interaction or document at some point during the same period of time. For example, at some time during the same day, or by the end of the same multi-day period, each of the evaluator and agent should evaluate the same task or document, but in one embodiment the evaluations need not take place at the same time.

In operations 450 and 452, each of the evaluator and agent may review the interaction or document; e.g. each may listen to the call or interaction (or read a transcript, view a video, etc., as appropriate) and provide answers (e.g. agent answers and evaluator answers each associated with a question) to questions. Typically, each person evaluating performs the evaluation in isolation from other evaluators, to prevent influence and ensure the people evaluating feel free to be honest. In one embodiment the document should be reviewed or the audio of the interaction listened to before questions are answered, and in another embodiment questions may be answered while the call is being reviewed. In one embodiment scores or ratings associated with answers are not displayed (but rather are hidden) to the reviewer (e.g. agent or evaluator) at the time of evaluation but rather after the evaluations are over, at the time of the evaluation comparison. However, in other embodiments scores or ratings may be displayed at the time of evaluation, or may never be displayed.

A module such as form painter module 68 may in conjunction with internet browsers 17 and 19 display screens or computer display pages (e.g. a series of screens displayed on a computer or terminal monitor e.g. on terminals such as agent terminals 16 and user terminals 18, each including one or more question/answer combinations) from the form to an agent and evaluator, and may receive or accept from the agent (e.g. via agent terminals 16), for each question, an agent answer associated with a question, and may receive or accept from one or more evaluators (e.g. via user terminals 18) for each question evaluator answer(s) associated with questions. Each answer may have an associated score or rating which is typically pre-set or predetermined, e.g. in operation 400. Each of the evaluator and agent may move or proceed through the different screens of the form, and answer the questions. Answering a question having an associated score may cause a module such as form executor module 67 to record the score. Typically, the user viewing the form and answering form questions does not see and is not shown the score, but in some embodiments the user may see the score. Each of the evaluator and agent may also enter free text answers. Other formats for answering questions may be used.

Figure 7:
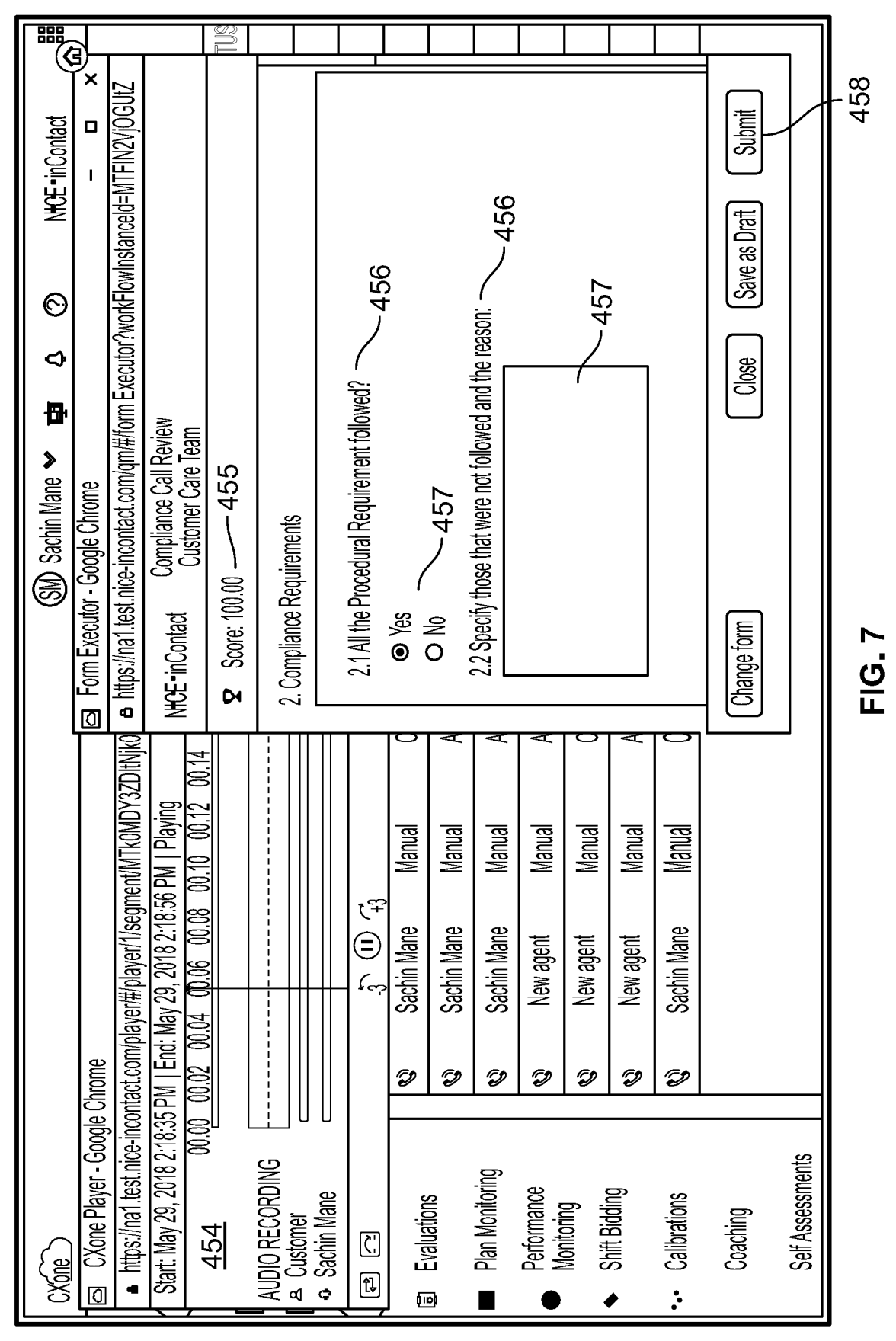

FIG. 7 depicts a screen seen by a person evaluating an interaction (e.g. an agent or evaluator), according to some embodiments. FIG. 7 includes audio playback control 454 controlling audio playback for the interaction, cumulative score 455 (in one embodiment based on answers provided up to the point of this display), questions 456, answer fields 457, and "submit" button 458 which may be used to finalize or submit the form, after the evaluation is complete.

In operations 460 and 462, each of the evaluator and agent when finished reviewing the questions on the form, may finalize or submit the form, which causes in operation 470 the answers and scores, and/or in some embodiments one number which is the cumulative score, to be stored (e.g. in database 52). For example, form executor module 67 may receive or accept from the agent and evaluator (e.g. via agent terminals 16 and user terminals 18) a submission or indication indicating that the person has completed the computerized evaluation form. Data may be stored for example in a JSON document in a MySQL table which includes the information of the form, with answers and possibly scores added: e.g. a JSON or other document including questions and answers may be provided, and form executor module 67 may add actual responses—e.g. answers with scores—to the form. Other data storage formats may be used. One example of a data storage format for answers to questions, using the JSON format, is shown in FIG. 8. A top section shows an evaluator's answers and a bottom section shows an agent's answers. The top section shows that the person associated with a certain user identification (ID) returned answers summing to a total score listed after "score". The evaluator's answer in a top section to a first question with ID of 101 is indexed or labelled as 1 and has a score of 10. Other data or result storage formats may be used. Operations 460 and 462 need not take place at the exact same time.

In operation 480, for the specific interaction and specific form, a presentation or display may be created or displayed, e.g. using form painter module 68, showing the variance in scores between the agent and evaluator and, typically side by side on one screen, the different answers for each question. The variance may be computed from for example the sum (for each person, e.g. an agent or the one or more evaluators) of all scores associated with answers received for each person. Form painter module 68 may allow permitted personnel, such as the people making the evaluation (the agent and the evaluator) or other people, to view the presentation or display.

While viewing a presentation, a viewer may view a series of screens, each screen including a variance (for the overall interaction or for the answers displayed on the screen) and one or more questions and the answers to the displayed questions received from both the agent and evaluator. A module displaying the presentation may display, at the same time, concurrently and/or on the same screen, one or more evaluation questions; the agent answer(s) associated with the evaluation question(s); the evaluator answer(s) associated with the evaluation question(s); and the variance.

Figure 9:
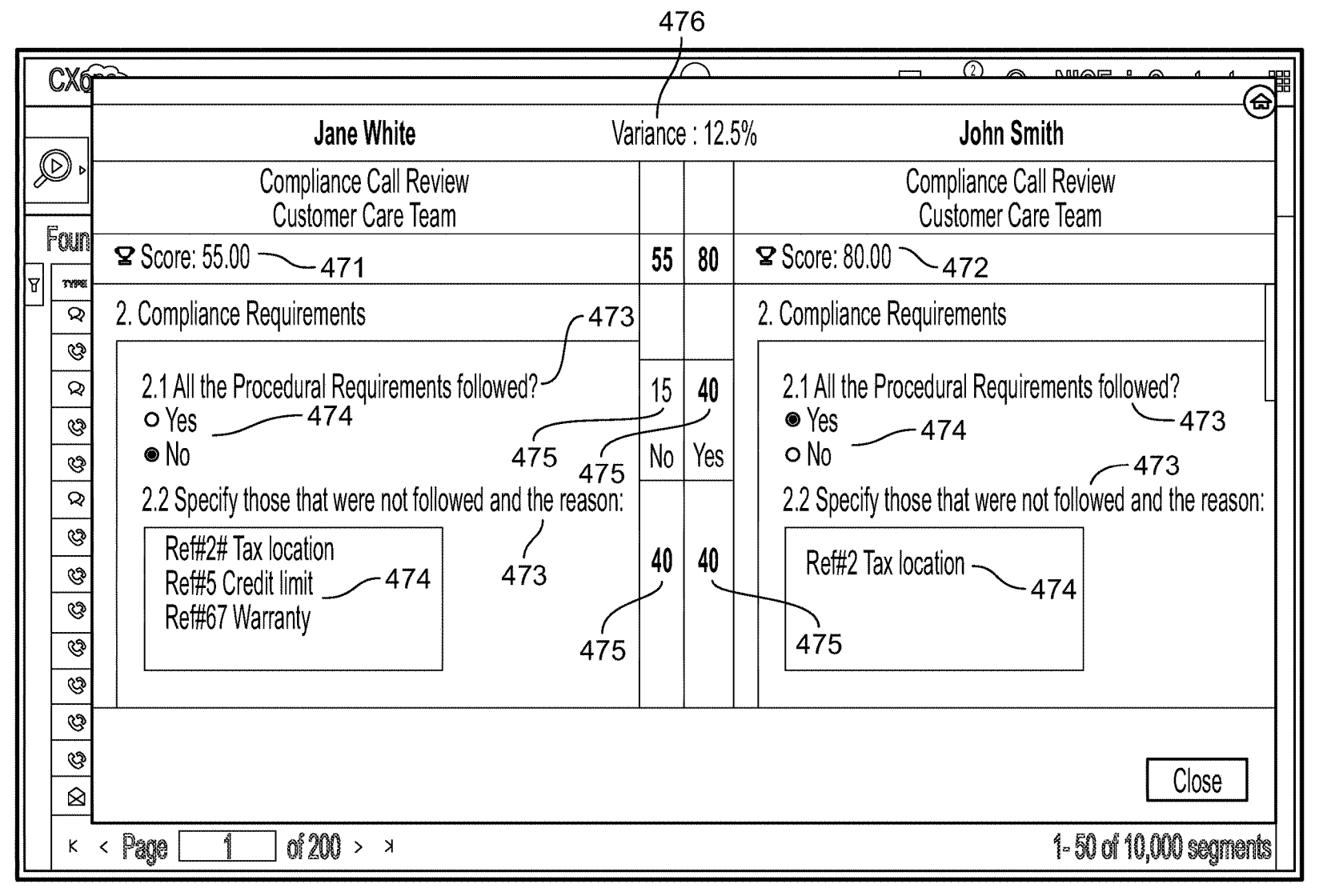

For example, a screen may show one question, e.g. "Did the agent finish the call with the customer properly", and an agent answer (e.g. "yes") and an evaluator answer (e.g. "no"), and a free form text box labelled "What did the agent miss", showing the evaluator entry "Thank you to the customer." If more than two people participated in the evaluation, more than two answers may be displayed at a time. The free form text box may or may not be associated with a score. Contradictions where an evaluator and agent submit different answers for the same question may be seen. The scores for the individual answers may be shown on the presentation. FIG. 9 depicts an example screen displayed after an evaluation is complete, according to one embodiment. Evaluator score 471 and agent score 472 may be displayed; these scores may be the total for all answers answered by the evaluator and agent respectively, or the cumulative score up to the question(s) currently displayed. Questions 473 and answers 474 may be shown, along with scores 475 corresponding to the answers. Variance 476 may be displayed. In some embodiments, a free text entry answer may assign a certain score or rating if any text is entered, and a different score or rating (e.g. 0) if no text is entered. This may occur for example in the case that the question associated with the free text entry answer is a positive question, and any answer is positive.

Other or different operations may take place, and modules and hardware other than those discussed above may be used.

A variance of the total score each evaluator's answers sum to may be created. The variance (e.g. a measure of how far numbers are spread out from their average value) may be a measure of how different the evaluator answers and agents are. In the case that two people, such as an evaluator and agent participate, an evaluator_score (summing an evaluator rating from the ratings associated with all of the answers provided by the evaluator) and agent_score (summing an agent rating from the ratings associated with all of the answers provided by the agent) are created. More participant scores may be created, e.g. if there are more participants in the evaluation process beyond one evaluator and one agent.

The addition of all the answer scores of evaluator results in evaluator score:

evaluator_score=evaluator_score_for_question1+ evaluator_score_for_question2+ . . . evaluator_score_for_questionN Similarly the addition of all the answer scores of agent results in agent_score:

agent_score=agent_score_for_question1+ agent_score_for_question2+ . . . agent_score_for_questionN Since each answer has an associated rating which may be different, questions that have answers with higher scores or ratings may inherently be weighted more in the variance thank questions with lower scores or ratings.

The mean may be calculated:

Mean=(evaluator_score+agent_score)/2

(in an example with more than two participants, all participant totals are added and 2 is replaced by the number of participants). The variance can be calculated using the below example formula (other formulas may be used):

% Variance=(|evaluator_score−Mean|+|agent_score−Mean|)*100(participants*Max Score)

Where participants is the number of participants (e.g. N evaluators+1 agent), in the example above two; Max Score is the highest score possible if all questions are answered with answers having the highest score for answers for that question (e.g. the sum over each question of the highest score or rating associated with answers for that question, for the set of screens displayed to each participant); and |X| indicates absolute value of X. If more than two participants exist, more |participant_score−Mean| entries may be used. While a percentage is used above, the variance need not be calculated or expressed as a percentage. In the event multiple evaluators numbered 1−N are used, the term |evaluator_score−Mean| may be replaced with N terms |evaluator_score_1−Mean|+ . . . +|evaluator_score_N−Mean|, the N terms being added in the numerator. If there are three questions, each with answers having scores as follows Q1A1 score 5; Q1A2 score 0; Q2A1 score 5; Q2A2 score 15; Q2A1 score 5; Q3A1 score 1; Q2A2 score 2; then Max Score is 22.

Embodiments of the present invention may improve prior evaluation technology, for example by providing user interfaces and computer processes encouraging agents to participate fully in the evaluation process. An agent providing an evaluation in parallel with another person, where the agent does not yet know the evaluation of the other person, is more likely to produce an honest evaluation. A "dispute" between the agent and another evaluator (a discrepancy among answers to the same question, or a large variance) may be, using embodiments of the present invention, an honest product of the process, and may be produced without the agent knowing there is a dispute, rather than an after-the-fact disagreement. A practical application of the formula and algorithm is realized by allowing agents involved in interactions or documents to more accurately and honestly rate their performance, and allowing agents to dispute their evaluation by others by providing evaluations without having seen others' evaluations. In such a manner a "dispute" is inherent in the difference between agents' and evaluators' answers.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

What is claimed is:

1. A method for evaluating interactions, the method, comprising, using a computer processor:
selecting, based on searching over a set of interactions, an interaction, the interaction involving an agent;
sending the selected interaction where the agent was involved and a computerized evaluation form to the agent and an evaluator, substantially simultaneously;
using an evaluation module, displaying to each of the evaluator and agent a set of screens defined by the computerized evaluation form, each screen including an evaluation question;
accepting from the agent an evaluation of the selected interaction where the agent was involved comprising for each evaluation question, an agent answer having associated with the agent answer a rating;
summing an agent rating from ratings associated with the agent answers provided by the agent;
summing an evaluator rating from ratings associated with evaluator answers provided by the evaluator;
calculating a variance from the agent rating and evaluator rating, wherein the variance is:

$$(|evaluator\_score-Mean|+|agent\_score-Mean|)*100/(2*MaxScore)$$

wherein evaluator_score is the sum of the ratings associated with the evaluator answers received from the evaluator;
agent_score is the sum of the ratings associated with the agent answers received from the agent;

$$Mean=(evaluator\_score+agent\_score)/2; \text{ and}$$

MaxScore=the sum over each of the evaluation questions of the highest score or rating associated with answers for that question; and
displaying, at the same time: the evaluation question; the agent answer associated with the evaluation question; the evaluator answer associated with the evaluation question; and the variance.

2. The method of claim 1, comprising:
accepting a time interval definition, defining how often to select the interaction; and
accepting a selection parameter definition, defining parameters for which interactions to select when selecting the interaction;
wherein a distribution definition determining the selecting of the interactions comprises the time interval definition and the selection parameter definition.

3. The method of claim 1, comprising accepting from the evaluator, for each evaluation question, the corresponding evaluator answer having associated with the answer a rating.

4. The method of claim 1, comprising accepting a submission indicating that the evaluator has completed the computerized evaluation form and accepting a submission indicating that the agent has completed the computerized evaluation form.

5. The method of claim 1, wherein each answer associated with one of the evaluation questions has associated with the answer a predefined rating.

6. The method of claim 1, comprising:
receiving:
a set of evaluation questions;
for each evaluation question, an answer; and
for each answer, a rating; and
creating the computerized evaluation form using the received evaluation questions, received answers, and received ratings.

7. A system for evaluating interactions, comprising:
a memory and;
one or more processors configured to:
select, based on searching over a set of interactions, an interaction, the interaction involving an agent;

send the selected interaction where the agent was involved and a computerized evaluation form to the agent and an evaluator, substantially simultaneously;
use an evaluation module, displaying to each of the evaluator and agent a set of screens defined by the computerized evaluation form, each screen including an evaluation question;
accept from the agent an evaluation of the selected interaction where the agent was involved comprising for each evaluation question, an agent answer having associated with the agent answer a rating;
sum an agent rating from ratings associated with the agent answers provided by the agent;
sum an evaluator rating from ratings associated with evaluator answers provided by the evaluator;
calculate a variance from the agent rating and evaluator rating, wherein the variance is:

$$(|evaluator\_score-Mean|+|agent\_score-Mean|)*100/(2*MaxScore)$$

wherein evaluator_score is the sum of the ratings associated with the evaluator answers received from the evaluator;
agent_score is the sum of the ratings associated with the agent answers received from the agent;

$$Mean=(evaluator\_score+agent\_score)/2; and$$

MaxScore=the sum over each of the evaluation questions of the highest score or rating associated with answers for that question; and
display, at the same time: the evaluation question; the agent answer associated with the evaluation question; the evaluator answer associated with the evaluation question; and the variance.

8. The system of claim 7, wherein the one or more processors are configured to:
accept a time interval definition, defining how often to select the interaction; and
accept a selection parameter definition, defining parameters for which interactions to select when selecting the interaction;
wherein a distribution definition determining the selecting of the interactions comprises the time interval definition and the selection parameter definition.

9. The system of claim 7, wherein the one or more processors are configured to accept from the evaluator, for each evaluation question, the associated evaluator answer having associated with the answer a rating.

10. The system of claim 7, wherein the one or more processors are configured to accept a submission indicating that the evaluator has completed the computerized evaluation form and accept a submission indicating that the agent has completed the computerized evaluation form.

11. The system of claim 7, wherein each answer associated with one of the evaluation questions has associated with the answer a predefined rating.

12. The system of claim 7, wherein the one or more processors are configured to:
receive:
a set of evaluation questions;
for each evaluation question, an answer; and
for each answer, a rating; and
create the computerized evaluation form using the received evaluation questions, received answers, and received ratings.

13. A method for evaluating interactions, the method, comprising:

searching, using a processor, over a set of documents, for a document conforming to a selection definition and associated with an agent, the searching occurring according to a time interval;
sending the document associated with the agent and a computerized evaluation form to the agent and an evaluator, substantially simultaneously;
using an evaluation module, displaying to each of the evaluator and agent a set of screens defined by the computerized evaluation form, each screen including an evaluation question;
accepting from the agent an evaluation of the document, the accepting comprising for each evaluation question, an agent answer having associated with the agent answer a rating;
summing an agent rating from the ratings associated with the agent answers provided by the agent;
summing an evaluator rating from ratings associated with evaluator answers provided by the evaluator;
calculating a variance from the agent rating and evaluator rating, wherein the variance is:

$$(|evaluator\_score-Mean|+|agent\_score-Mean|)*100/(2*MaxScore)$$

wherein evaluator_score is the sum of the ratings associated with the evaluator answers received from the evaluator;
agent_score is the sum of the ratings associated with the agent answers received from the agent;

$$Mean=(evaluator\_score+agent\_score)/2; and$$

MaxScore=the sum over each of the evaluation questions of the highest score or rating associated with answers for that question; and
displaying, at the same time: the evaluation question; the agent answer associated with the evaluation question; the evaluator answer associated with the evaluation question; and the variance.

14. The method of claim 13, comprising:
receiving a time interval definition, defining how often to search for the document; and
receiving a selection definition, defining parameters for which documents to search for when searching for documents.

15. The method of claim 13 comprising accepting a submission indicating that the evaluator has completed the computerized evaluation form and accepting a submission indicating that the agent has completed the computerized evaluation form.

16. The method of claim 13, comprising:
receiving:
a set of evaluation questions;
for each question, an answer; and
for each answer, a score; and
creating the evaluation form using the received evaluation questions, received answers, and received scores.

17. The method of claim 13, comprising:
receiving a time interval, defining how often to select an interaction; and
receiving a selection definition, defining parameters for which interactions to select when searching for the document.

18. The method of claim 1, wherein the displaying of the evaluation question; the agent answer associated with the evaluation question; the evaluator answer associated with the evaluation question; and the variance; is on the same screen.

19. The method of claim 1, wherein the selecting of the interaction is by an automatic process according to a time interval definition, defining how often to select the interaction.

\* \* \* \* \*